Figure 1:
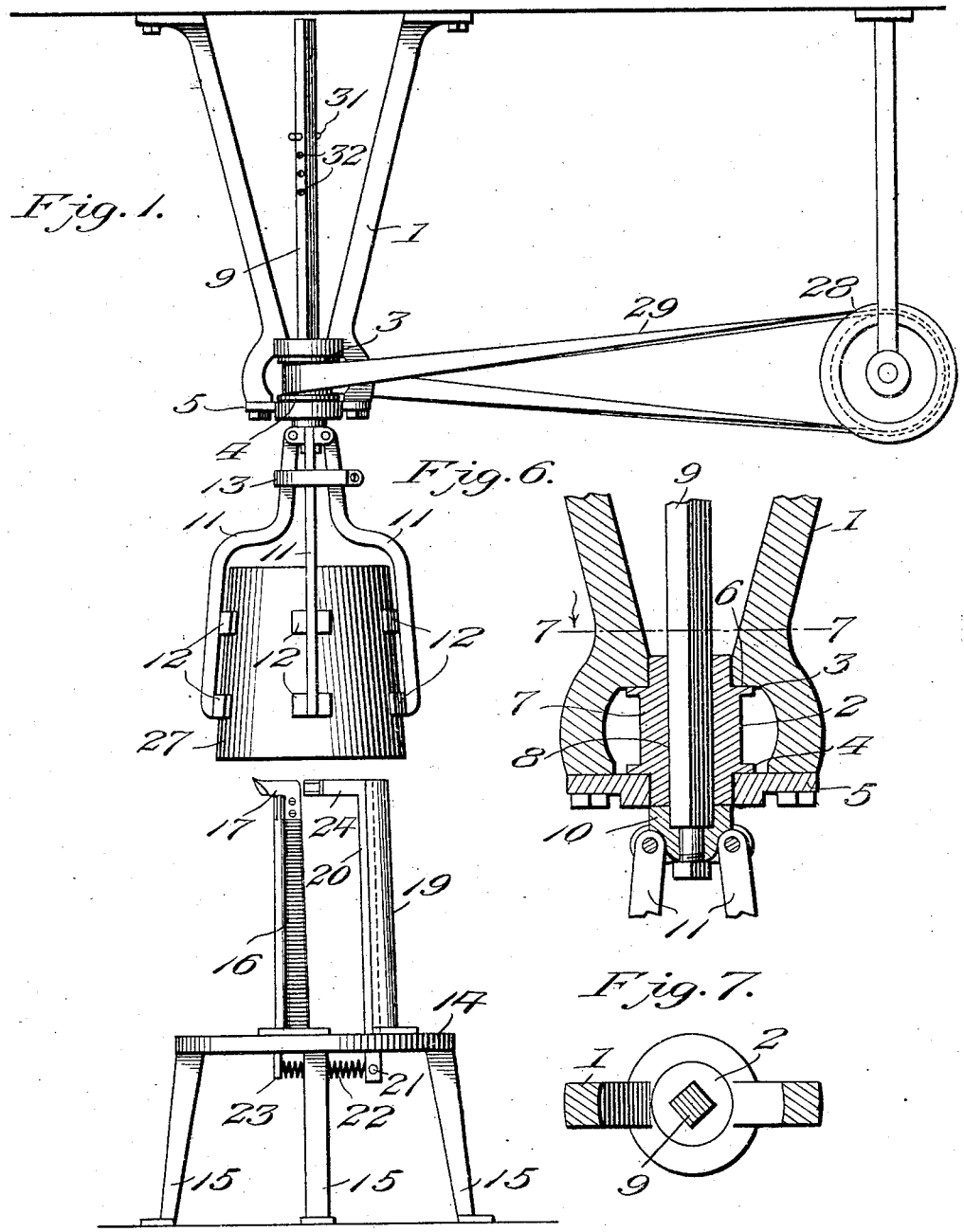

No. 846,270. PATENTED MAR. 5, 1907.
J. A. WATT.
BUCKET MAKING MACHINE.
APPLICATION FILED DEC. 13, 1905.
2 SHEETS—SHEET 2.
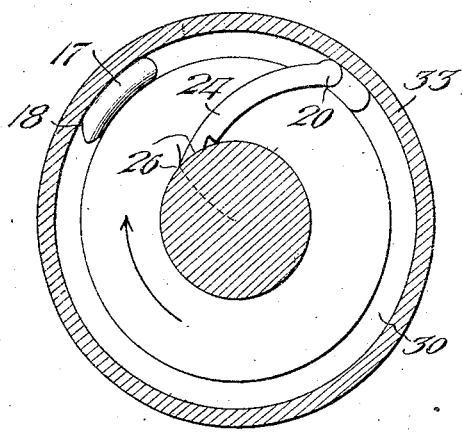
Fig. 2.
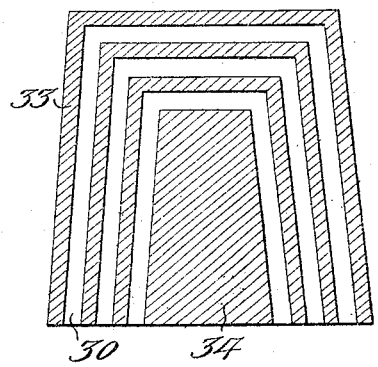
Fig. 3.
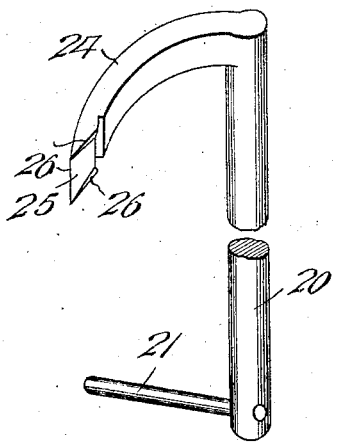
Fig. 4.
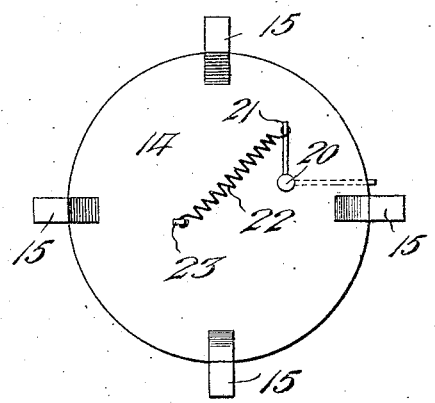
Fig. 9.
Fig. 5.
Fig. 8.
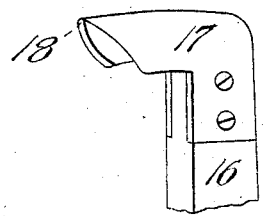
Witnesses
Frank B. Hoffman.
D. W. Gould.
Inventor
John A. Watt
By Victor J. Evans
Attorney
THE NORRIS PETERS CO., WASHINGTON, D. C.

UNITED STATES PATENT OFFICE.

JOHN ALEXR. WATT, OF HALIFAX, NOVA SCOTIA, CANADA.

BUCKET-MAKING MACHINE.

No. 846,270.

Specification of Letters Patent.

Patented March 5, 1907.

Application filed December 13, 1905. Serial No. 291,660.

*To all whom it may concern:*

Be it known that I, JOHN ALEXR. WATT, a subject of the King of Great Britain, residing at Halifax, in the Province of Nova Scotia and Dominion of Canada, have invented new and useful Improvements in Bucket and Tub Making Machines, of which the following is a specification.

The invention relates to an improvement in bucket and tub making machines comprising, essentially, a machine adapted in operation to construct a single-piece bucket or tub from a block of suitable material.

The main object of the present invention is the production of a machine adapted to successively operate upon a block of material and turn therefrom a plurality of single-piece or integral buckets or tubs which are of uniform shape, but successively of decreasing size, thereby providing a nest of buckets or receptacles constructed from a single block of material.

The invention consists in certain details of construction and arrangement of parts, which will be fully described in the following specification, reference being had to the accompanying drawings, in which—

Figure 1 is a view in side elevation of a machine constructed in accordance with my invention. Fig. 2 is a transverse section through the block being operated upon, illustrating particularly the means for severing the bottom of the bucket from the block. Fig. 3 is a vertical sectional view illustrating a nest of buckets produced by my machine from a single block of material. Fig. 4 is a perspective view of the cutter for severing the bottom of the bucket from the block. Fig. 5 is a detail perspective illustrating the cutter for severing the side or wall of the bucket from the block. Fig. 6 is an enlarged vertical section illustrating the means for operating the block. Fig. 7 is a sectional view on line 7 7 of Fig. 6. Fig. 8 is a view in elevation of a log initially shaped to provide a series of bucket-forming blocks. Fig. 9 is a bottom plan view of the table, illustrating particularly the means for operating the chisel-cutter.

Referring to the drawings, my improved machine comprises hangers 1, fixed to and depending from a suitable support and revolubly supporting at their lower ends a drive-pulley 2. Near the respective ends the pulley is formed with circumferential flanges 3 and 4, the latter being supported on plates 5, removably secured to the lower end of the hangers 1, while the former bears beneath a shoulder 6, provided on each hanger. Between the flanges 3 and 4 the body of the pulley is somewhat enlarged to provide a belt-surface 7, the hangers 1 adjacent the body being curved from their normal planes to permit operation of the belt. By this construction the hangers 1 effectively support the belt-pulley in a manner to permit its free revolution, while at the same time preventing other independent movement. The plate 5 is preferably in the form of a disk centrally apertured to receive the end of the pulley and secured to the lower ends of the hangers through the medium of suitable bolts.

The pulley 2 is formed with a central squared bore 8, in which is slidably mounted a bar 9, similar in sectional contour to the bore of the pulley, whereby the bar is compelled to revolve in the movement of the pulley, but is permitted an independent vertical movement with relation thereto. A head-block 10 is secured to the end of the bar 9 below the pulley, to which head is pivotally secured clamping-arms 11, each of which is bent intermediate its length to offset its free end, and is provided at said free end and at a point approximately midway the length of the offset portion with gripping blocks or plates 12. The clamping-arms 11, preferably four in number, are pivotally connected to the head 10 and equally spaced apart circumferentially of the head. A clamping-ring 13, designed to encircle all of the clamping-arms adjacent their connection with the head, is adapted for adjustment longitudinally of said arms to secure the free ends thereof in clamping position, it being understood that the portions of said arms with which said ring coöperates are preferably inclined downwardly and outwardly from the head to provide for the frictional holding of the clamping-ring when securing a block within said arms, as hereinafter described.

Directly below the clamping-arms is arranged a table 14, fixedly supported upon legs 15 and arranged to support the cutting mechanism for the machine. The table is designed to support two cutters, one adapted for cutting the side or wall of the bucket from the block and hereinafter termed the "gouge" and the other adapted to cut the bottom of the bucket from the block and hereinafter termed the "chisel." The gouge comprises a standard 16, secured to the table and carrying on its upper end a cutter 17, formed with a gouge-cutting point 18, said cutter projecting at right angles to the standard with the operating end of the gouge-blade offset in a plane slightly above the main plane of the blade. The chisel-cutter comprises a standard 19, in which is revolubly supported a shaft 20, the lower end projecting below the table 14 and provided with a laterally-projecting arm 21, to which is secured one end of a coil-spring 22, the other end being fixed to a lug 23, depending from the table. The upper end of the shaft 20 is provided with a curved arm or blade 24, the outer or free end of which is formed into a chisel-point 25 and preferably sharpened to provide an end and side cutting edges 26. The blade 17 of the gouge-cutter and the arm 24 of the chisel-cutter are each curved on a plane concentric with the curvature of the wall of the bucket to be shaped, the standard 16 and the shaft 20 being in circumferential alinement relative to the central point of the block to be operated upon.

The material to be operated upon, which is ordinarily in the form of a log or the like, is initially shaped to provide a series of bucket-blocks, as illustrated in Fig. 8, each of the blocks 27 being severed from the whole as desired for use. One of the blocks is properly secured between the clamping-arms 11, immediately and centrally above the table 14. The pulley 2, which is connected by a suitable source of power 28 through the medium of the belt 29, is operated, causing a revolution on the block 27. The weight of the block causes a downward movement of the bar 9 until said block contacts with the cutting mechanism. The gouge and chisel-cutter are so positioned as to lie and operate in a plane concentric with the edge of the block, but spaced from said edge equal to the desired thickness of the bucket-wall. As the block continues its downward movement and also its revoluble movement the gouge-point 18 will cut a circumferential groove 30 longitudinally of the block until said block has reached its limit of downward movement, which limit is controlled through the medium of a pin 31, engaging any one of a series of openings 32 formed in the bar 9 and serving to contact with the upper surface of the pulley and limit the downward movement of the bar. The operation of the gouge is thereby limited in its cutting operation longitudinally of the block, and when this limit has been reached the shaft 20 of the chisel-cutter is permitted to yield to the power of the spring 22, it being understood that a pin or other suitable device is arranged with relation to the shaft 20 to prevent its operation by the spring during the longitudinal gouging of the block. The tension of the spring is directed to drawing the chisel-cutting end toward the center of the block, so that said chisel in the continued revolution of the chisel serves to form a channel transverse of the block and communicating with the longitudinal channel formed by the gouge. This operation severs a bucket-shaped shell from the block, as at 33, freeing the remainder of the block and completely forming an integral bucket. By reducing the radial distance of the gouge and chisel-cutters with relation to the center of the block a second bucket-shell may be cut from the block just operated upon, and the operation may be continued until the shells removed from the block are in required number, when the remaining portion or core of the block, as 34, may be utilized for any desired purpose.

By the operation described I am enabled to form a nest of buckets or tubs from a single block of material, each receptacle comprising an integral shell and being cut from the block by two distinct operations.

Having thus fully described the invention, what I claim as new, is—

1. A bucket-making machine comprising means for revolubly supporting a block of material, a cutting means adapted for initial entry into a channel in the block and arranged for movement toward and from the axis of rotation, said means cutting in opposition to the movement of rotation of the block.

2. A bucket-making machine comprising a support for a block of material, a cutting means arranged for initial entry into a channel formed in the block, said means cutting in opposition to the movement of rotation, means for producing a relative rotation between the block and the cutting means, and means for operating said cutting means at an angle to the axis of rotation.

3. A bucket-making machine comprising means for revolubly supporting a block of material, a gouge-cutter for forming a channel longitudinally of the block, a cutting means adapted for initial entry into said channel and arranged to cut in opposition to the movement of rotation of the block, and means for moving said cutting means in a plane at an angle to the axis of rotation.

4. A bucket-making machine comprising means for revolubly supporting a block of material, a gouge-cutter for forming a channel longitudinally of the block and concentric of its surface, and a chisel-cutter for forming a channel transverely of the block to connect with the longitudinal channel, said chisel-cutter traveling in the path of the gouge-cutter and being normally inoperative.

5. A bucket-making machine comprising means for revolubly supporting a block of material, a gouge-cutter for forming a channel longitudinally of the block and concentric of its surface, and a chisel-cutter for forming a channel transversely of the block to connect with the longitudinal channel, said chisel-cutter traveling in the path of the gouge-cutter and being normally inoperative, and means to feed said chisel transversely of the block.

6. A bucket-making machine comprising means for revolubly supporting a block of material, a table secured below said means, a gouge-cutter supported by said table, a chisel-cutter revolubly supported by the table, a spring for operating said cutter, and means for securing the chisel-cutter against the operation of the spring.

In testimony whereof I affix my signature in presence of two witnesses.

JOHN ALEXR. WATT.

Witnesses:
J. H. BUCHANAN,
J. A. KNIGHT.